Feb. 17, 1925.

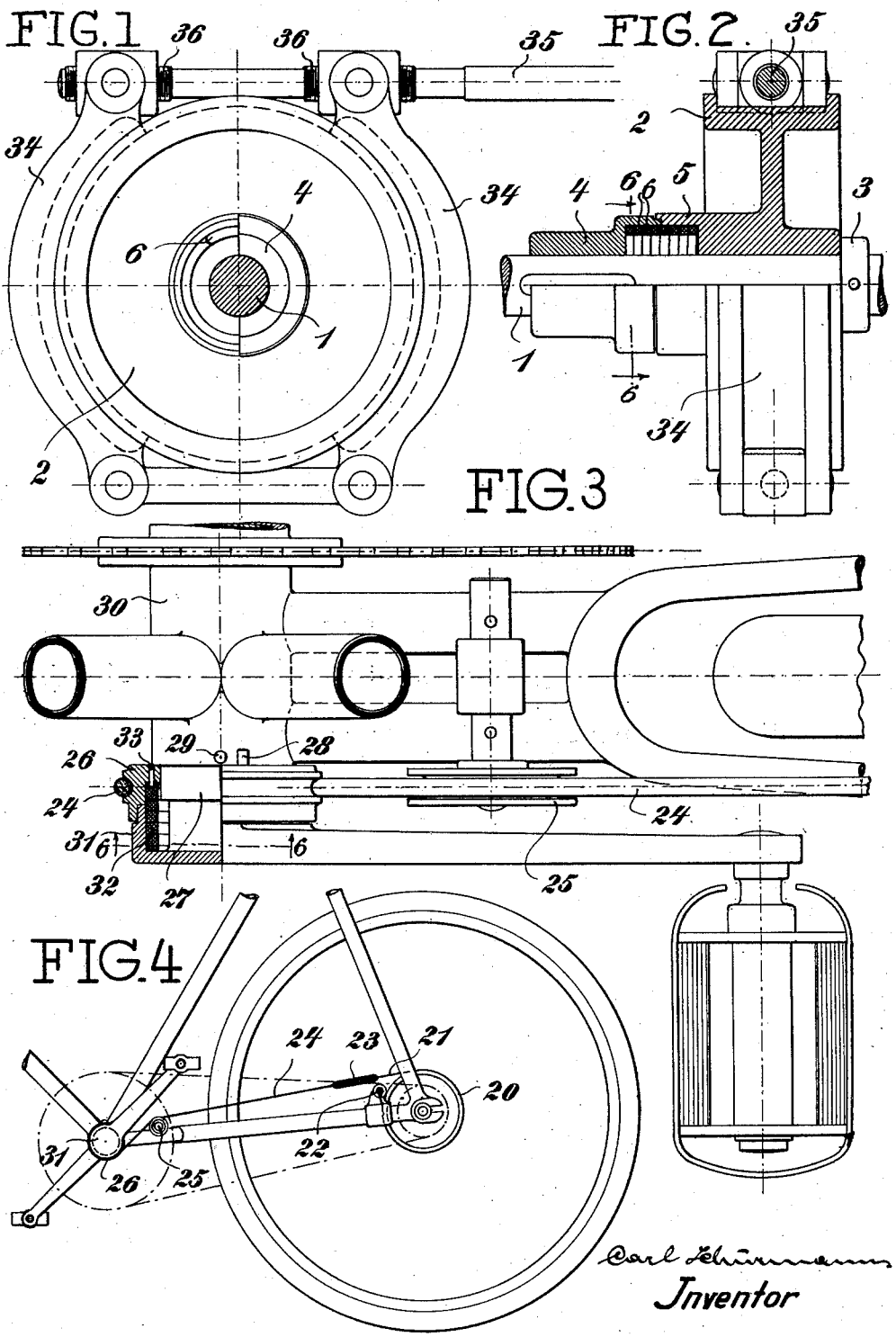

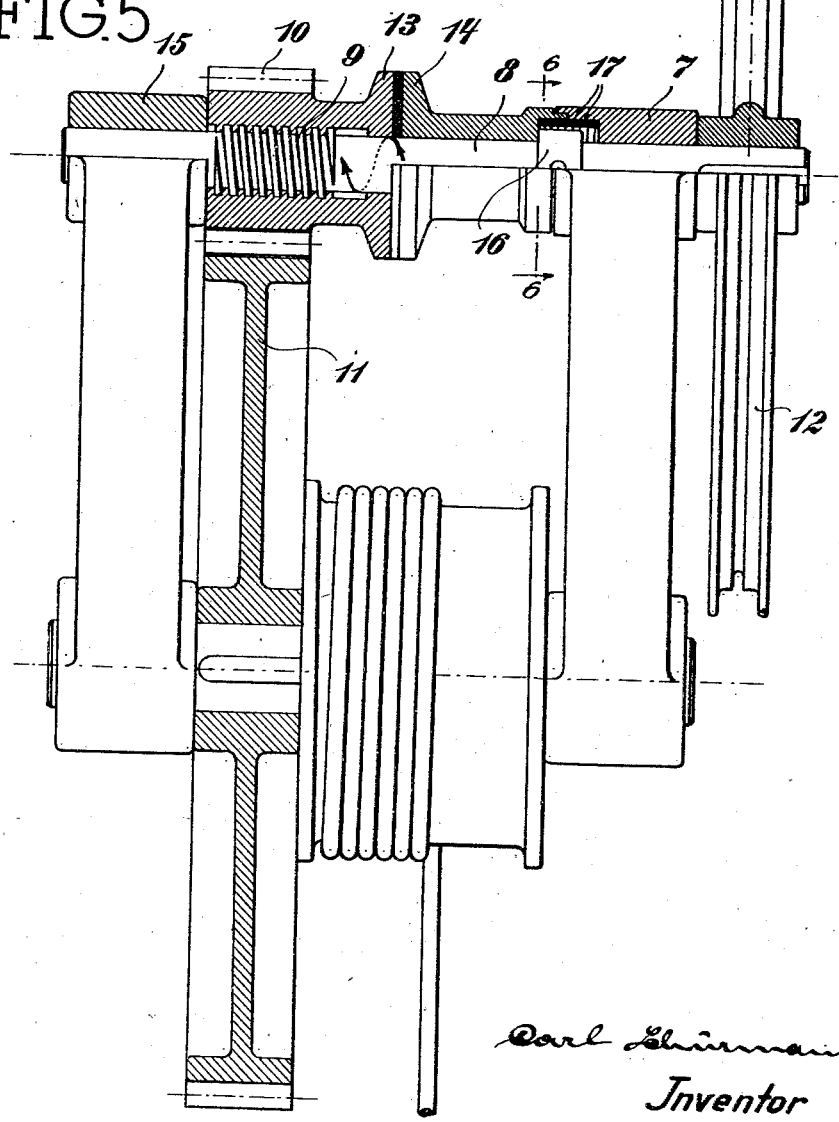

C. SCHÜRMANN

AUTOMATIC BRAKE

Filed Dec. 7, 1920

INVENTOR.
CARL SCHÜRMANN,
BY
ATTORNEY.

Patented Feb. 17, 1925.

1,526,806

UNITED STATES PATENT OFFICE.

CARL SCHÜRMANN, OF DUSSELDORF, GERMANY.

AUTOMATIC BRAKE.

Application filed December 7, 1920. Serial No. 429,012.

*To all whom it may concern:*

Be it known that I, CARL SCHÜRMANN, a citizen of the German Republic, and residing at Dusseldorf, Germany, have invented certain new and useful Improvements in Automatic Brakes, of which the following is a specification.

This invention relates to braking appliances which are adapted to operate automatically in case the direction of rotary motion changes (viz. is reversed) thus assuring the mechanism against reverse motion.

Such brakes are applicable in the case of elevating machines, vehicles and other machinery.

The subject of the present invention is an anti-reversal brake which acts in such a manner that a helical spring inserted between the moving or driving part and a braking device coils up owing to circumferential friction against the said driving part when the latter turns forward, thus allowing it to move freely, but on the reverse motion of the moving part uncoils owing to its circumferential friction against the same, thus coupling it together with the braking device by the strong pressure produced by this action.

The accompanying drawings represent examples of construction embodying the invention. In these drawings—

Fig. 1 is an elevation, and

Fig. 2 an axial section of a brake applicable for various purposes.

Figs. 3 and 4 show a bicycle brake by means of an outside view and a section on a larger scale.

Fig. 5 is a section of driving mechanism for an elevating machine.

Fig. 6 is a section on the line 6—6 of Figs. 2, 3, 5, and 8.

Fig. 7 an elevation in partial section of the helical spring per se.

Figure 8:
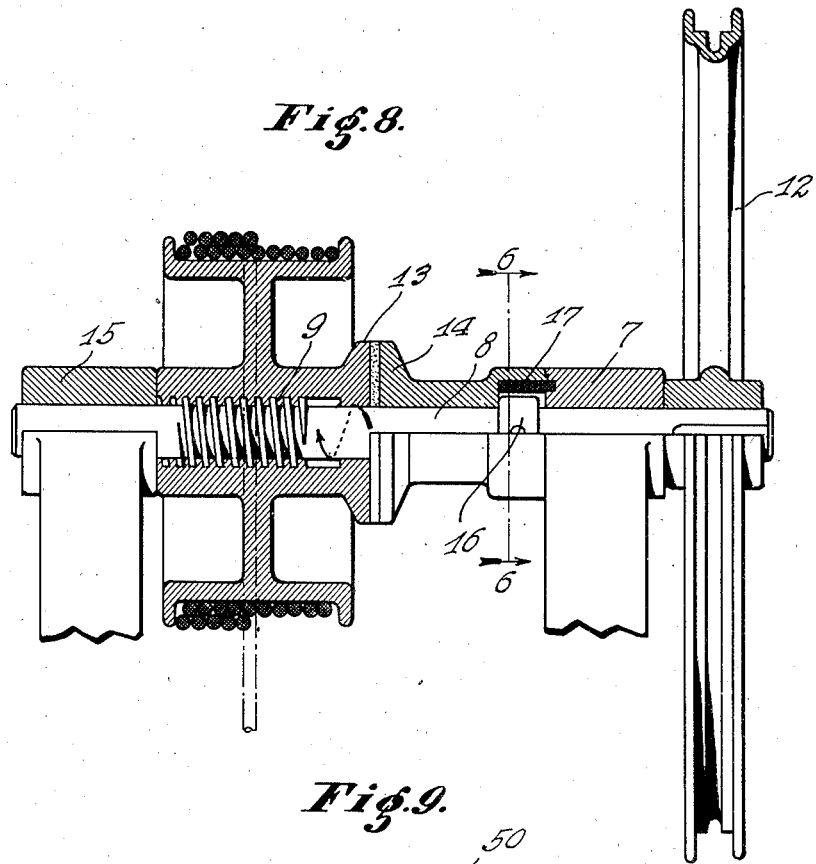
Figure 9:
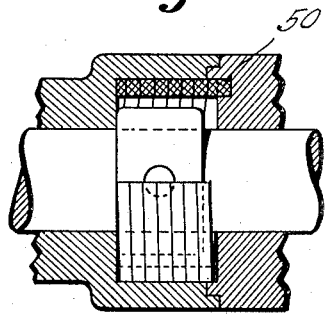

Fig. 8 is a view similar to Fig. 5, but with the winding drum directly on the screw-threaded member of the driving shaft instead of being mounted on a separate shaft geared to said threaded member; and Fig. 9 is an enlarged section similar to parts of Figs. 5 and 8, showing one end of the helical spring positively anchored.

1 in Fig. 1 is a shaft, for instance the Cardan shaft of a motor vehicle, on which is mounted a brake-pulley 2, which is prevented from axial displacement by a set-ring 3 and a sleeve 4 fixed on the shaft 1. The sleeve 4 and the hub 5 of the brake-pulley 2 are close together, preferably overlapping each other, and have equal cylindrical cavities facing each other, into which fits a helical spring 6, so as to exert only little outward pressure. In other respects the brake may be constructed in a known manner. In the present example the brake blocks 34 are adapted to be tightened and slackened by means of a spindle 35 having opposite screw-threads 36.

When the brake blocks or cheeks are tightened fast on the pulley 2 the shaft 1 together with the sleeve 4 fixed on the same can only turn in the direction in which the helical spring will coil itself together or contract owing to its circumferential friction on the hub 5, and sleeve 4, for in that case these two parts can slide upon each other. If, however, the shaft tends to turn in the opposite direction, that is to say, backward, the same circumferential friction causes the helical spring to uncoil or expand thereby pressing against the walls of the common cavity formed in the hub and sleeve. By this action the hub and sleeve are coupled together and the reverse motion of the shaft is prevented.

If, however, it is desired that the shaft should turn backward, it is sufficient to slacken the brake pressure on pulley 2, as by loosening the brake blocks 34, after which the pulley turns with the shaft.

In the second example of construction the rear axle of a bicycle is provided with any known free-wheel device. The said axle is moreover provided with a brake pulley 20 carrying a brake band 21, one end of which is fixed to a pin or bolt 22 on the bicycle frame.

The brake band is laid around the pulley in the direction of turning and (if desired by means of a spring 23) connected with a wire 24, which is guided over a roller 25 on the lower part of the cycle frame or fork and after partly encircling a sleeve 26, is fixed to the latter. The sleeve 26 is mounted on the turned extremity 27 of the pedal crank bearing 30 and provided with a stud 28 situated behind (with respect to the direction of rotation) a stud 29 fixed to the bearing 30. The pedal crank hub 31 has a bore or cavity into which is inserted a right hand helical spring 32 with the sleeve 26 connected to the inner end thereof by means of a pin 33.

When the cranks are pedalled in the forward direction the helical spring 32 coils together slightly owing to its friction against the hub 31, so that the latter slides over the same. When the cranks are pedalled slightly backward, however, the helical spring coils apart at once owing to the friction, thus pressing against the bore of the hub and coupling the hub with the sleeve 26.

The wire 24 is therefore rolled up from below and thereby the brake band 21 tightened according to the force of back-pedalling.

The pins 28 and 29 prevent the sleeve 26 from being carried too far when pedalling in the direction of travel, whereby the wire rope and the brake band would become too slack.

Fig. 5 shows another example of construction, suitable for elevating machines.

The countershaft 8 mounted in the stationary bearing 7 carries a driving wheel (hand-chain wheel 12). The shaft 8 has also a screw thread 9 on which a pinion 10 is movable within narrow limits (viz. between the bearing 15 and the brake-disc 14). The toothed pinion 10 meshes with a spur-wheel 11 of the elevating apparatus. The equal cylindrical cavities of the bearing 7 and of the brake disc 14 enclose a helical spring 17 fitting into the same.

If the countershaft 8 is turned by the hand-chain wheel 12 in the direction of the arrow, the screw-thread 9 draws the pinion 10 and its brake face 13 towards the brake disk 14, which abuts against a collar 16 fixed on the shaft 8. As there is nothing to prevent the brake disk 14 from turning in the direction of the arrow, because the helical spring 17 coils together in this direction owing to its circumferential friction, the rope drum can be turned, while taking the brake face with it. If, however, the hand-chain is released, only the turning moment of the load on the rope drum comes into action and tends to turn the pinion 10 by means of the spur-wheel 11 in the direction opposite to that of the arrow. Consequently the pinion 10 is turned on the screw-thread 9 and pressed against the brake disk 14. The brake-disk 14 cannot turn in this direction, because the helical spring 17 owing to its circumferential friction now coils outward and is pressed against the walls of the cavities so as to couple the brake disk 14 together with the stationary bearing 7.

By this action the lifted load is secured against running back automatically. However, backward movement can be obtained under the control of the hand-chain wheel 12, for by turning such wheel backward there is relative movement along the screw-thread 9 of the pinion 10 to release the braking action at the brake face 13 to permit the pinion 10 to turn backward by the same amount that the wheel 12 is so turned. Thus a load on the brake drum may be lowered with ease, and under complete control; since it cannot run away beyond the point permitted by the movement of the wheel 12.

It is only in the case of large elevating devices that I deem it necessary to have the winding drum mounted on a separate shaft from the shaft 8. In Fig. 8 I show the winding drum mounted on the internally screw-threaded member which co-operates with the screw-thread 9 of the driving shaft 8, instead of the pinion 10.

The helical spring may be free in the recesses in both members in which it fits, as illustrated in Figs. 2 and 5, or may have one end attached in one of said recesses, as by the pin 33 shown in Fig. 3 or by the bent spring-end 50 shown in Fig. 9.

I claim:

1. A reverse-brake mechanism, comprising a rotary member which may rotate in either direction, a fixed member, an intermediate member between said fixed member and said rotary member, said parts being associated with friction braking surfaces which both control and are controlled by relative movement between the intermediate member and one of the other members, said intermediate member and the other of said two other members being co-axial and having axially abutting faces with alined circular recesses in them, and a single helical spring fitting in said recesses to lock said co-axial members together when they are moved relatively in the direction to unwind said spring and to unlock them when they are moved relatively in the other direction.

2. A reverse-brake mechanism, comprising a rotary member which may rotate in either direction, a fixed member, an intermediate member between said fixed member and said rotary member, said parts being associated with friction braking surfaces which both control and are controlled by relative movement between the intermediate member and one of the other members, said intermediate member and the other of said two other members being co-axial and one of them having a circular recess in its end face, and a single helical spring having a driving connection with the other of said two co-axial members and fitting in said recess to lock said co-axial members together when they are moved relatively in the direction to unwind said spring and to unlock them when they are moved relatively in the other direction.

3. A reverse-brake mechanism, comprising two co-axial parts having axially abutting surfaces with alined circular recesses in such abutting surfaces, and a helical spring fitting in said recesses to lock together said two co-axial parts when they tend to rotate relatively in the direction to unwind the spring and to unlock them when they tend to rotate relatively in the other direction, a shaft and a friction brake controlling said shaft and brought into braking action by the locking together of said two parts upon said first-named relative movement.

4. A reverse-brake mechanism, comprising two co-axial parts one of which has a circular recess in its end face, and a helical spring having a driving connection with the other of said two co-axial parts and fitting in said recesses to lock together said two co-axial parts when they tend to rotate relatively in the direction to unwind the spring and to unlock them when they tend to rotate relatively in the other direction, a shaft, and a friction brake controlling said shaft and brought into braking action by the locking together of said two parts upon said first-named relative movement.

5. A reverse-brake mechanism comprising a frame, a rotatable driving member, a rotatable driven member co-axial with said driving member, a third rotatable member co-axial with said first two members and irreversibly rotatable relative to said frame, and means operating to cause the interlocking of said three rotatable members when said driving member tends to turn in one direction relative to said driven member and to permit free rotation of said driven member relative to said third rotatable member when said driving member is turned in the opposite direction relative to said driven member.

6. A reverse-brake mechanism comprising a frame, a shaft rotatably mounted in said frame, a driven member mounted on said shaft, a second member mounted on said shaft and irreversibly rotatable relative to said frame, and means operating to cause the interlocking of said shaft and said two members when the shaft is turned in one direction relative to said driven member and to permit the free rotation of said driven member relative to said second member when said shaft is turned in the opposite direction relative to said driven member.

7. A reverse-brake mechanism comprising a frame, a rotatable driving member, a rotatable driven member co-axial therewith, a third member co-axial with said driving and driven members and arranged to lock to both said driving and driven members when said driving member is rotated in one direction relative to said driven member and to unlock and permit free rotation of said driven member when said driving member is rotated in the opposite direction relative to said driven member, and means operating between said third member and said frame to permit rotation of said third member with said driving and driven members when said driving member is turned in the direction to lock the three members together and to prevent rotation of said third member in the opposite direction.

8. A reverse-brake mechanism comprising a frame, a rotatable driving member, a rotatable driven member co-axial therewith, a third member co-axial with said driving and driven members and arranged to lock to both said driving and driven members when said driving member is rotated in one direction relative to said driven member and to unlock and permit free rotation of said driven member when said driving member is rotated in the opposite direction relative to said driven member, said third member and said frame having axially abutting faces with alined circular recesses in them, and a helical spring fitting in said recesses to prevent rotation of said third member relative to said frame in that direction which tends to unwind said spring but to permit rotation in the opposite direction.

9. A reverse-brake mechanism comprising a frame, a rotatable driving member, a rotatable driven member co-axial therewith, a third member co-axial with said driving and driven members and arranged to lock to both said driving and driven members when said driving member is rotated in one direction relative to said driven member and to unlock and permit free rotation of said driven member when said driving member is rotated in the opposite direction relative to said driven member, said third member and said frame having axially abutting faces one of which parts is provided with a circular recess, and a helical spring having a driving connection with the other of said parts and fitting in said recess to prevent rotation of said third member relative to said frame in that direction which tends to unwind said spring but to permit rotation in the opposite direction.

10. In an elevator, the combination of a frame, a shaft rotatably mounted in said frame, a friction clutch member co-axial with said shaft and capable of irreversible rotation relative to said frame, a second friction clutch member mounted on screw threads on said shaft and arranged to engage said first clutch member by the action of the screw threads when said shaft is turned relatively to said frame and said second clutch member in the direction in which said first clutch member is capable of rotation.

11. In an elevator, the combination of a frame, a driving shaft rotatable in said frame, said shaft having an abutment, a rotatable driven member co-axial with said shaft, a second member co-axial with said shaft and irreversibly rotatable relative to said frame, and means operating to clamp said second member between said driven member and the abutment on said shaft when said shaft is turned in one direction relative to said driven member and to release said second member from said driven member and said shaft-abutment when said shaft is turned in the opposite direction relative to said driven member.

12. In an elevator, the combination of a frame, a shaft rotatably mounted in said frame, a friction clutch member co-axial with said shaft, said friction clutch member and said frame having axially abutting faces with alined circular recesses in them, a helical spring fitting in said recesses to prevent rotation of said friction clutch member relative to said frame in that direction which tends to unwind said spring but to permit rotation in the opposite direction, a second friction clutch member mounted on screw threads on said shaft and arranged to engage said first clutch member by the action of the screw threads when said shaft is turned relatively to said frame and said second clutch member in the direction in which said first clutch member is capable of rotation.

13. In an elevator, the combination of a frame, a shaft rotatably mounted in said frame, a friction clutch member co-axial with said shaft, said friction clutch member and said frame having axially abutting faces one of which parts is provided with a circular recess, a helical spring having a driving connection with the other of said parts and fitting in said recess to prevent rotation of said friction clutch member relative to said frame in that direction which tends to unwind said spring but to permit rotation in the opposite direction, a second friction clutch member mounted on screw threads on said shaft and arranged to engage said first clutch member by the action of the screw threads when said shaft is turned relatively to said frame and said second clutch member in the direction in which said first clutch member is capable of rotation.

14. A reverse-brake mechanism comprising a frame, a shaft rotatably mounted in said frame, a driven member mounted on said shaft, a second member mounted on said shaft and irreversibly rotatable relative to said frame, and means for locking said driven member to said second member upon turning the shaft in the direction said second member is free to rotate and for unlocking said driven member from said second member to permit it to follow the shaft upon rotation of the shaft in the other direction.

15. A reverse brake mechanism comprising a frame, a rotatable driving member, a driven member co-axial with said driving member and rotatable relative thereto, such relative rotary movement in one direction being limited, a third rotatable member co-axial with said first two members and irreversibly rotatable relative to said frame, and means operating when said driving and driven members reach such limit of relative rotation to cause interlocking of said three rotatable members.

In testimony whereof I affix signature.

CARL SCHÜRMANN.